B. R. PARROTT.
TRACTOR.
APPLICATION FILED MAR. 11, 1916.
1,278,498.
Patented Sept. 10, 1918.
4 SHEETS—SHEET 1.
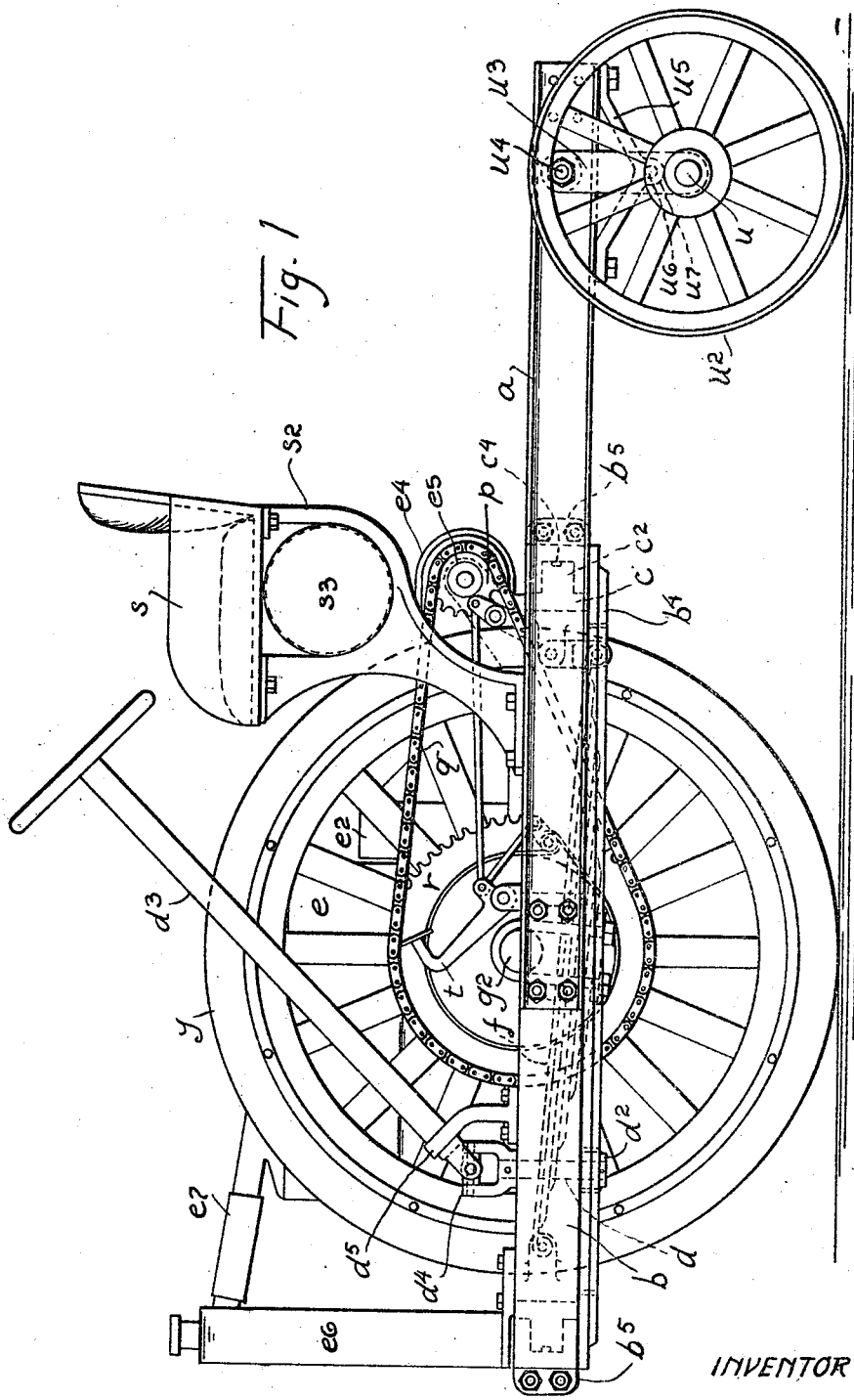
INVENTOR
Bert R. Parrott
BY Ralzemond A. Parker ATTORNEY

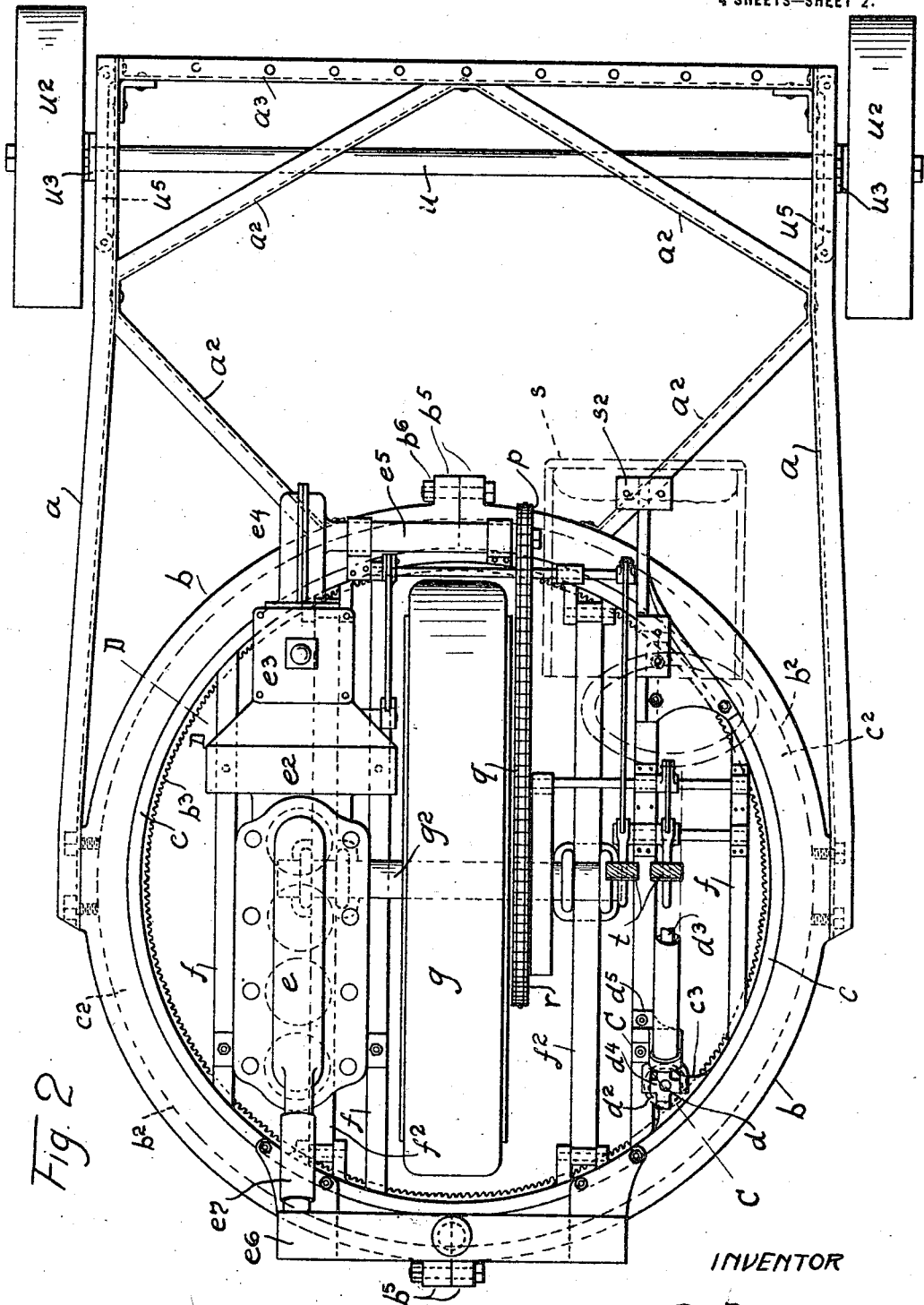

B. R. PARROTT.
TRACTOR.
APPLICATION FILED MAR. 11, 1916.
1,278,498.
Patented Sept. 10, 1918.
4 SHEETS—SHEET 3.
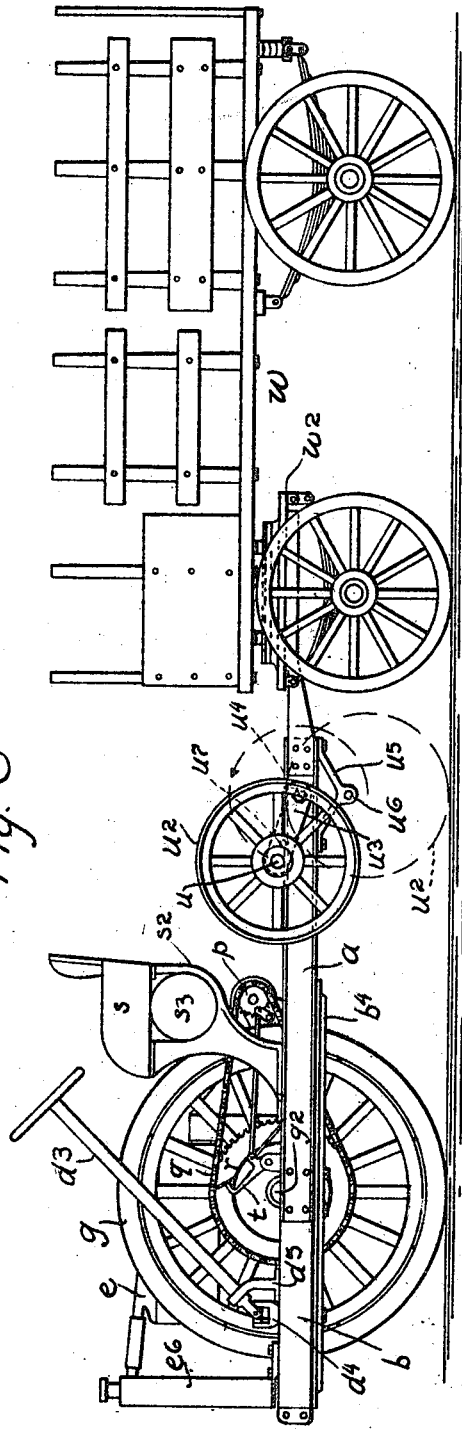
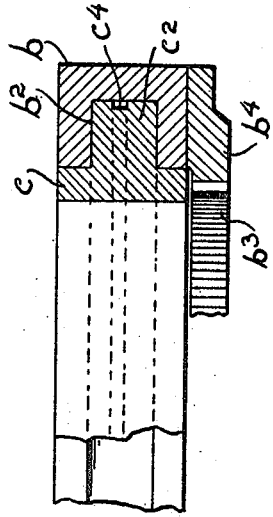
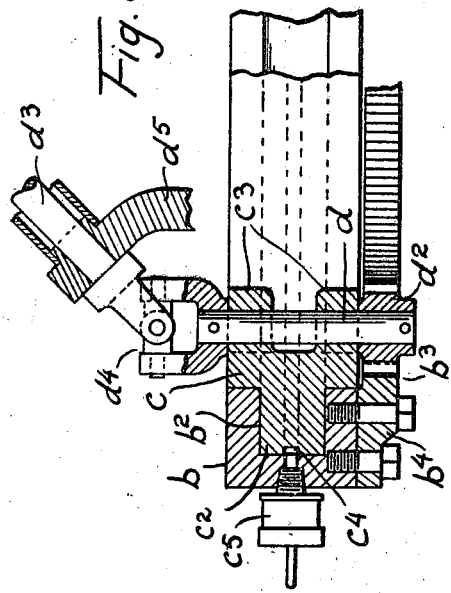
INVENTOR
Bert R. Parrott
BY Palzemond A. Parker ATTORNEY

UNITED STATES PATENT OFFICE.

BERT R. PARROTT, OF JACKSON, MICHIGAN, ASSIGNOR, BY MESNE ASSIGNMENTS, TO HIGHWAY TRACTOR COMPANY, OF INDIANAPOLIS, INDIANA, A CORPORATION OF INDIANA.

TRACTOR.

1,278,498.

Specification of Letters Patent. Patented Sept. 10, 1918.

Application filed March 11, 1916. Serial No. 83,449.

*To all whom it may concern:*

Be it known that I, BERT R. PARROTT, a citizen of the United States, residing at Jackson, county of Jackson, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

My invention relates to tractors and objects of my improvements are to provide an improved tractor of simple construction that may be cheaply made and conveniently and efficiently operated.

I secure these objects in the apparatus illustrated in the accompanying drawings in which, Figure 1 is a side elevation of a tractor embodying my invention.

Fig. 2 is a plan view of the same.

Fig. 3 is a detail section on the line C—C Fig. 2.

Fig. 4 is a detail section on the line D—D Fig. 2.

Fig. 6 is a side elevation illustrating the way of connecting the tractor to a vehicle to be drawn.

Figure 5:
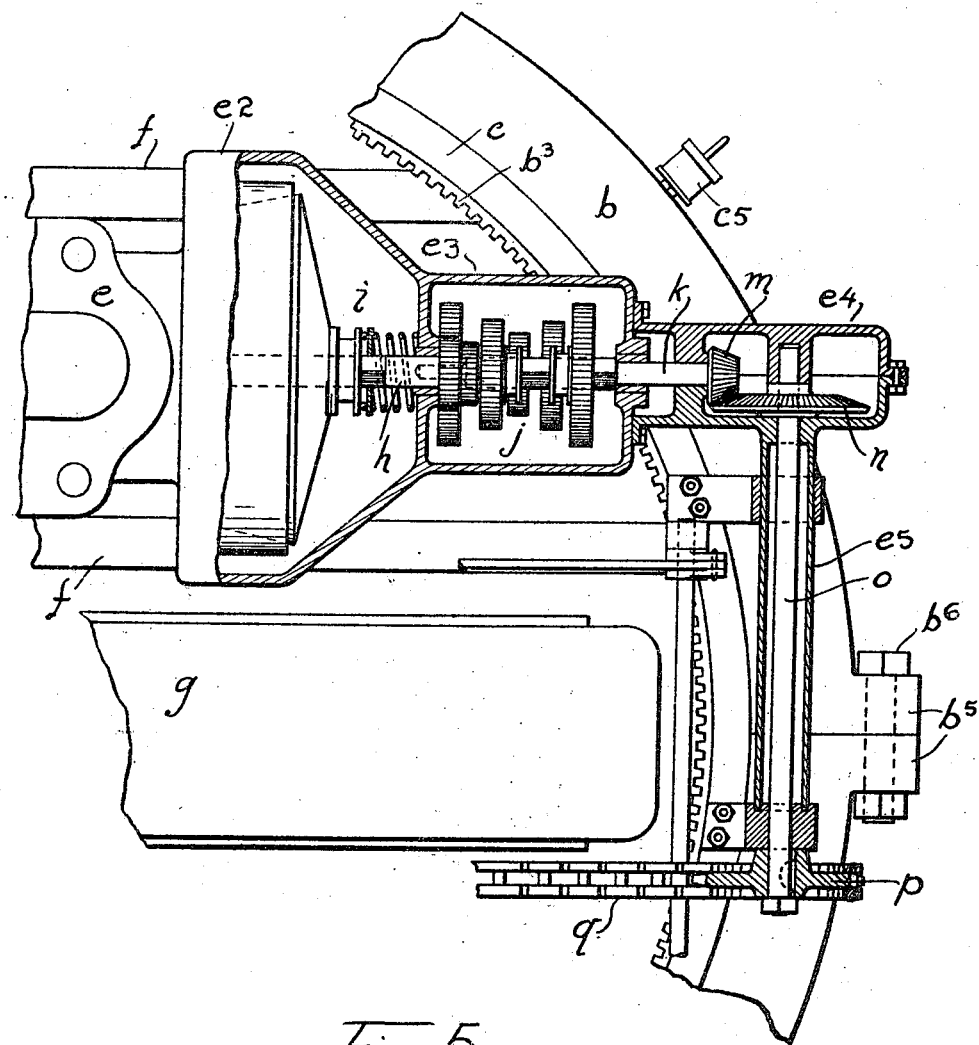
Fig. 5 is a detail plan view, partly in section to show the transmission mechanism.

$a$ $a$ are side pieces of a frame or chassis. $a^3$ is a cross piece between the ends of the side pieces $a$ $a$. $a^2$ indicates braces for strengthening the frame.

$b$ is a split ring having ears $b^5$ which may be fastened together by bolts $b^6$ through eyes therein to secure the two halves of the ring $b$ together.

The ring $b$ extends between the side pieces $a$ $a$ and is secured thereto so as to form part of the chassis and the forward braces $a^2$ are secured to such ring and to the side pieces $a$ $a$, as shown, so that the whole makes a rigid construction.

The ring $b$ is provided with a groove $b^2$ (Figs. 3 and 4) in its interior surface and extending around said ring. $c$ is a second ring having an annular flange, or ridge, $c^2$, around its periphery which flange fits into the groove $b^2$ in the ring $b$, so that the ring $c$ is thereby held in place and may rotate concentric with the ring $b$. $c^4$ is an oil groove extending completely around the periphery of the flange $c^2$. $c^5$ indicates oil cups which pass through apertures in the ring $b$ and communicate with the groove $c^4$. Lubricating material may be supplied from the cups $c^5$ and distributed around the groove $b^2$ and the surface of the flange $c^2$.

$b^4$ is a ring bolted to the lower surface of the ring $b$ and provided with internal teeth $b^3$. The ring $b^4$ is concentric with and extends completely around the ring $b$. $c^3$ (Fig. 3) are lugs extending inward from the ring $c$. $d$ is a vertical shaft adapted to turn in bearings in the lugs $c^3$ provided with a pinion $d^2$ at its lower end, the teeth of which engage the teeth $b^3$ of the ring $b^4$. $d^3$ is an inclined steering shaft of the usual construction held and adapted to rotate in a standard $d^5$ secured to and rising from the upper surface of the ring $c$, or rather of a cross piece or brace $f$ extending from side to side of said ring. The shaft $d^3$ is joined by a universal joint $d^4$ to the shaft $d$. By turning the shaft $d$ the ring $c$ is revolved to different angular positions because of the action of the pinion $d^2$ upon the teeth of the ring $b^4$.

There are a number of cross pieces or braces $f$ extending as cords from side to side of the ring $c$. $f^2$ are springs by which the chassis is supported by the wheel $g$. $g$ is a traction wheel in a plane at right angles to the plane of the ring $c$ and having a shaft $g^2$ turning in bearings secured to the springs $f^2$.

$e$ is a motor. In this particular instance a 4-cylinder internal combustion engine is indicated. $e^2$ is the clutch casing, $e^3$ the change speed gear casing, $e^4$ the transmission gear casing, and $e^5$ a casing for the counter shaft $o$. $e^6$ is a radiator secured by brackets to the ring $c$, $e^7$ indicates the conduit for the cooling water of the engine.

$s$ is a seat secured by a bracket $s^2$ to the ring $c$ located above said ring on the opposite side of the wheel $g$ to that at which the engine $e$ is located. The bracket $s^2$ is branched at its upper end and accommodates the cylindrical gasolene tank $s^3$ from which the engine $e$ is supplied with fuel.

$i$ (Fig. 5) is a clutch mechanism which may be of conventional construction. $h$ and $k$ are the two parts of the transmission shaft between which the change speed gearing $j$ of usual or convenient construction is interposed. $o$ is a counter shaft inclosed in a casing $e^5$. $n$ is a conical gear wheel on one end of the counter shaft $o$, and $m$ is a conical gear wheel on the transmission shaft $k$ engaging the gear wheel $n$. $p$ is a sprocket wheel on the counter shaft $o$ at the end opposite to that upon which the gear wheel $n$ is keyed. $r$ is a sprocket wheel on the shaft $g^2$. $q$ is a sprocket chain extending over the sprocket wheels $p$ and $r$.

All the power and transmission mechanism above described is secured upon the ring $c$. It will be observed that the engine is located upon one side of the driving wheel $g$, that the transmission shaft extends parallel to the plane of said wheel and that the power is transferred past and to the other side of said wheel by the counter shaft $o$ and is then brought back to the shaft of said wheel by the sprocket chain $q$ so as to secure compactness of construction and bring the parts conveniently within the carrying surface of the ring $c$.

$u$ is a shaft extending transversely of the frame of the machine near the rear end thereof. The shaft $u$ bears and is adapted to turn in the outer end of two links $u^3$, the other end of each of said links being pivoted at $u^4$ to a side piece $a$. $u^5$ is a bracket secured to each side piece $a$ of the frame below the same and having an aperture $u^6$ at its lower portion. There is a corresponding aperture $u^7$ in each of the links $u^3$.

By this construction the wheels $u^2$ on the shaft $u$ may be turned to a position in which they rest upon the upper surface of the side pieces $a$ of the frame, as shown in Fig. 6, or they may be turned downward to the position shown in Figs. 1 and 2 in which position they would be secured by a pin engaging in the apertures $u^6$ and $u^7$. In this latter position they would serve to support the frame of the tractor and hold the same in its proper position.

Ordinarily the tractor would be secured to a vehicle or truck $w$ and may be secured immediately to a portion of the fifth wheel $w^2$ so as to permit of the tractor turning the wheels of the truck so that it shall properly follow the tractor. Under these conditions the truck, or following vehicle, will support the rear end of the tractor and the wheels $u^2$ may be thrown up to their carried position out of use.

The operation of the above described device will be obvious from the above description and drawings. The driver or operator occupies the seat $s$ where the governing pedals $t$ may be controlled by his feet and the steering wheel may be operated. By turning the steering shaft $d^3$ the ring $c$ carrying with it the driving wheel $g$ is turned to different positions and as the driving mechanism and engine is carried with the ring $c$ which supports the driving wheel the force is always favorably and directly applied to the driving wheel.

What I claim is:

1. In a tractor, the combination of a frame comprising a rectangular section and a pair of semi-circular sections detachably connected thereto, a unit frame ring revolubly mounted in said semi-circular frame sections, a tractor wheel mounted on the revoluble frame section, and a motor mounted on the revoluble frame section connected to drive the tractor wheel, substantially as set forth.

2. In a tractor, the combination of a frame, a revoluble section mounted in the horizontal plane of said frame, a single tractor wheel mounted centrally of said revoluble section, a motor mounted on the revoluble section to one side of the tractor wheel, a transmission from the motor connected to drive the tractor wheel on the other side thereof, a seat for the driver mounted on the revoluble section opposite the motor, a control for the motor, and a steering control located adjacent said seat, the whole forming a structure balanced about the point of ground contact, substantially as set forth.

3. In a tractor, the combination of a frame having an annular section, a revoluble frame section mounted in said annular section, a single tractor wheel mounted centrally of the revoluble section, a motor mounted on the revoluble section to one side of the tractor wheel, a transmission from the motor connected to drive the tractor wheel from the other side of the tractor wheel, a seat for the driver mounted on the revoluble section opposite the motor, a radiator balanced on the revoluble section, a steering mechanism, and a transmission control located adjacent the seat of the driver on said revoluble frame, substantially as set forth.

4. In a tractor, the combination of a frame, a revoluble section mounted in the frame, a single tractor wheel mounted centrally of said revoluble section, a motor mounted on the revoluble section to one side of the tractor wheel, a counter-shaft disposed transversely of the revoluble section and connected with said motor, a flexible driving connection between the counter-shaft and the tractor wheel on the side opposite the motor, and a steering control, substantially as set forth.

5. In a tractor, the combination of a frame, a revoluble section mounted in the frame, a single tractor wheel mounted centrally of said revoluble section, a motor mounted on the revoluble section to one side of the tractor wheel, a radiator mounted on said section at the front, a counter-shaft mounted on and disposed transversely of the revoluble section at the rear, a flexible driving connection between the counter-shaft and the tractor wheel on the side opposite the motor, a steering wheel, and a driving connection between the steering wheel and the revoluble section, substantially as set forth.

6. In a motor driven truck, the combination of a body, wheels supporting the body at one end thereof, a revoluble section in the body at the other end thereof, a single tractor wheel journaled in said revoluble section, a motor mounted on the revoluble section to one side of the tractor wheel, a seat mounted on the revoluble section on the other side of the tractor wheel, a driving connection between the motor and the tractor wheel on the side opposite the motor, and a steering control, substantially as set forth.

7. In a tractor, a single and centrally located traction wheel, a power transmitting shaft extending parallel to said wheel upon one side thereof, a counter-shaft extending at right angles to said transmission shaft to the other side of said traction wheel, and means for conveying power extending from said counter-shaft to said traction wheel on the opposite side of the latter to that upon which said transmission shaft is located.

8. In a tractor, a single and centrally located traction wheel, a power transmitting shaft extending parallel to said wheel upon one side thereof, a counter-shaft extending at right angles to said transmission shaft to the other side of said traction wheel, and a sprocket chain for conveying power extending from said counter-shaft to said traction wheel on the opposite side of the latter to that upon which said transmission shaft is located.

9. In a tractor, a single and centrally located traction wheel, a power transmitting shaft extending parallel to said wheel upon one side thereof, a counter-shaft extending at right angles to said transmission shaft to the other side of said traction wheel, and means for conveying power extending from said counter-shaft to said traction wheel on the opposite side of the latter to that upon which said transmission shaft is located, a chassis, a carrying frame mounted in said chassis, said traction wheel and power transmission mechanism being mounted on said frame.

In testimony whereof, I sign this specification.

BERT R. PARROTT.